July 31, 1934.  W. F. EISENHAUER  1,968,482
THROTTLE CONTROL FOR GEAR SHIFT LEVERS
Filed Sept. 24, 1932
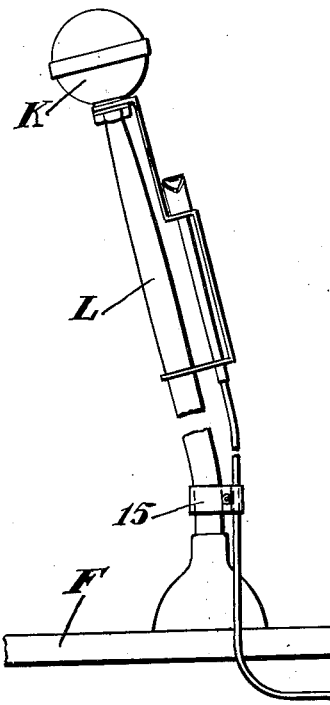
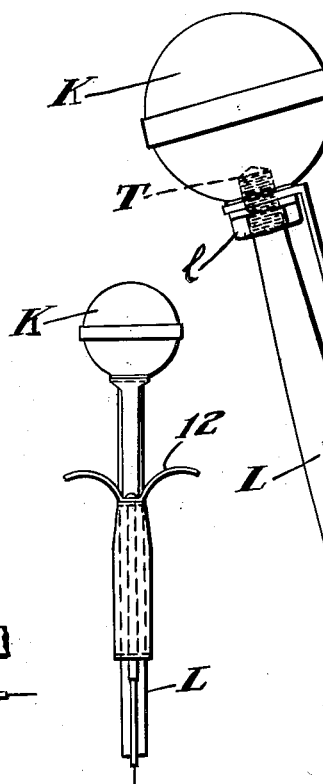
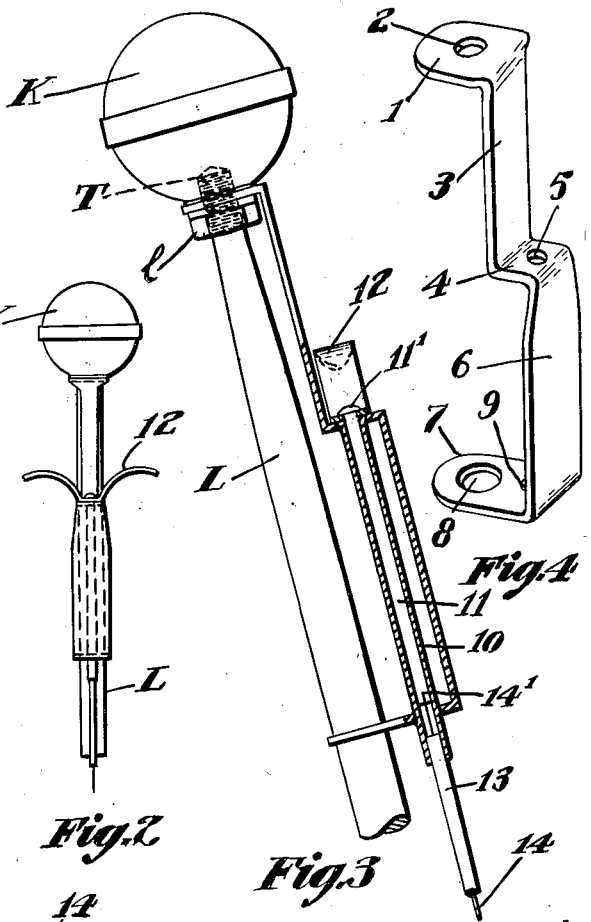
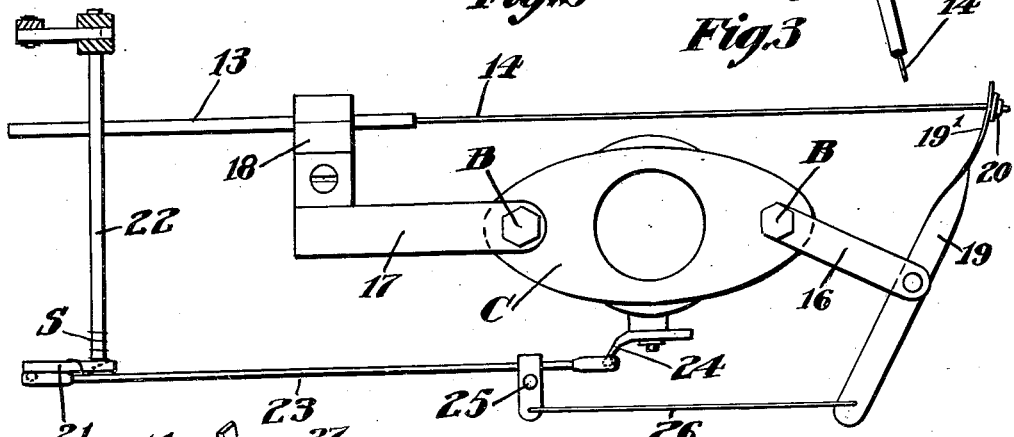
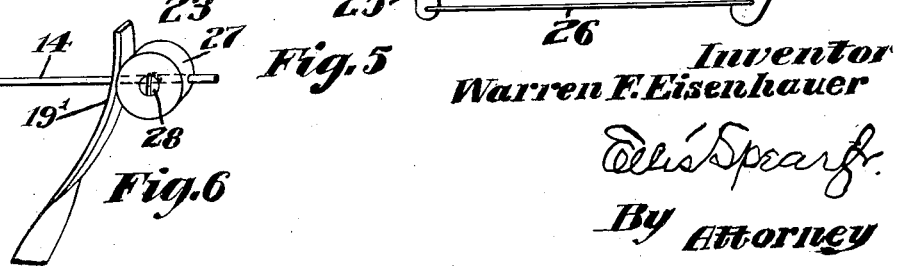
Inventor
Warren F. Eisenhauer
By Attorney Patented July 31, 1934

1,968,482

UNITED STATES PATENT OFFICE 1,968,482

THROTTLE CONTROL FOR GEAR SHIFT LEVERS

Warren F. Eisenhauer, Cambridge, Mass.

Application September 24, 1932, Serial No. 634,657

7 Claims. (Cl. 74—107)

In throttle controls for motor vehicles and the like having a gear shift controlled by a hand lever, it has been proposed to mount an auxiliary finger throttle on the gear shift so as to permit the operator to assume a hand control of the engine while shifting gears or at such other times as the usual foot throttle is not convenient.

My present invention relates to certain improvements by which such a device is provided in simple form and which is capable of ready installation without alteration of the car and without disturbing the usual control.

In accordance with my invention I provide a simple mounting for the finger control which is adapted to be slipped on over the standard gear shift handle and held in place by the usual knob or ball which is usually attached by being threaded in the end of the lever.

My invention also contemplates the use of a flexible cable connection which affords a simple and efficient control for the throttle. I further contemplate a combination of this control with the usual throttle whereby the standard control is substantially undisturbed and operated in the usual manner while the auxiliary control is combined by a convenient hookup through which it is able to assume dominance when it is desired to secure hand operation.

As illustrative of my invention and as showing a practical and simple embodiment I have shown in the drawing a form of device in accordance with my invention. In the drawing:

Fig. 1 is a side elevation of a gear shift lever equipped with my finger control.

Fig. 2 is a front elevation of a portion of the same.

Fig. 3 is an enlarged side elevation with my finger control partly in section.

Fig. 4 is a view of the finger control frame.

Fig. 5 a plan view of the throttle hookup for the control, and

Fig. 6 is a detailed view of the preferred form of my wire clamp stop for the carburetor arm.

Referring to the drawing I have indicated at L a standard gear shift lever having a hand knob or ball K threaded as at T and normally bearing against a nut or flange $l$ on the lever L. My finger control consists of a frame preferably formed of flat stock and comprising an upper bracket 1 apertured at 2 to receive the threaded end T of the lever L. From this bracket 1 depends a portion 3 adapted to lie parallel with the lever L and be slightly spaced therefrom. From this portion 3 is an outwardly projecting portion 4 turned oppositely from the portion 1 and apertured at 5. This portion is connected as at 6 with a rearward bracket 7 having an enlarged aperture 8 adapted to embrace the gear shift lever and having a smaller aperture 9 aligned with the aperture 5.

Through these apertures extends a tubular guard 10 in which is a pull rod 11. At the upper end of this rod are a pair of finger holds 12 through which the rod 11 is headed as at $11^1$. In the lower end of the guard 10 is inserted a flexible casing 13 in which is the usual flexible pull wire 14 which is attached at $14^1$ to the pull rod 11. The casing 13 with its wire 14 is passed down along the gear shift handle L to which it may be held by any suitable clamp as 15 and passed through the floor board F or other convenient part so as to extend under the dash to the carburetor, indicated at C. The carburetor may be of any standard type. These usually bolt to the flange of the manifold as at B and thus afford a convenient means for attachment of the brackets 16 and 17. The bracket 17 has an angular clamp 18 which holds the end of the flexible casing 13. Pivoted to the bracket 16 is a lever 19 consisting of a flat strip having its end turned as at $19^1$ to receive the end of the flexible wire 14 which passes through it and is held by a washer and nut 20. The opposite end of the lever may be given any desired ratio for the advantage of the finger pull over the usual spring S which controls the arm 21 on the rock shaft 22 which is under the control of the pedal or other foot piece.

The arm 21 is connected as at 23 by a rod which has a ball and socket connection with the carburetor valve arm 24. Clamped to this rod as at 25 is a connecting rod 26 which goes to the end of the lever 19. Through this connection the finger control 12 by pulling on the wire 14 can move the lever 19 and thus move the rod 23 against the action of the spring S thus operating the throttle 24.

The connection as shown is very convenient and efficient but may be modified for different standard equipment and different arrangements of the parts and for different types of carburetor. The detail construction of the bracket, finger pull and connections may also be modified in design and in the arrangement and assembly of the parts. For example, the bracket end 7 may be omitted and the parts held by the upper clamped portion alone. In place of the nut and washer connection shown in Fig. 5, I preferably use the clamp 27 shown in Fig. 6. This consists of a disk having a diametric bore to receive the wire 14 which is clamped by an axial set screw 28.

The structure shown has the various features and advantages pointed out as a simple and inexpensive accessory or as original equipment but might be modified without departing from the spirit of my invention if within the limits of the appended claims.

What I therefore claim and desire to secure by Letters Patent is:—

1. A throttle control for a gear shift lever, said control comprising a frame including aligned bracket portions having apertures adapted to receive the lever shaft, an offset portion between said brackets, a pull slidable therein, a finger piece on said pull and normally contacting said offset so as to be reached by the fingers in use.

2. A throttle control for a gear shift lever having a hand piece threaded on its end, said control comprising a frame including aligned bracket portions having apertures adapted to receive the lever shaft and one of said brackets being disposable under the hand piece so as to be clamped thereby, an offset portion between said brackets, a pull slidable therein, a finger piece on said pull and normally contacting said offset, and in spaced relation to the handpiece of the lever so as to be reached by the fingers in use.

3. A throttle control for a gear shift lever, said control comprising a frame including aligned bracket portions having apertures adapted to receive the lever shaft, an offset portion between said brackets consisting of a pair of parallel angular portions and a connecting web, a tubular guide having its ends passing through the angular portions of said offset, a pull slidable therein, a finger piece on said pull and normally contacting said offset and in spaced relation to the lever end so as to be reached by the fingers in use.

4. A throttle control for a gear shift lever having a hand piece threaded on its end, said control comprising a frame including aligned bracket portions having apertures adapted to receive the lever shaft and one of said brackets being disposable under the hand piece so as to be clamped thereby, an offset portion between said brackets consisting of a pair of parallel angular portions and a connecting web, a tubular guide having its ends passing through the angular portions of said offset, a pull slidable therein, a finger piece on said pull and normally contacting said offset and in spaced relation to the lever end so as to be reached by the fingers in use.

5. A throttle control for a gear shift lever having a hand piece threaded on its end, said control comprising a frame including aligned bracket portions having apertures adapted to receive the lever shaft and one of said brackets being disposable under the hand piece so as to be clamped thereby, a pull slidable in said frame, a finger piece on said pull and in spaced relation to the handpiece of the lever so as to be reached by the fingers in use.

6. A throttle control for a gear shift lever, said control comprising a frame including aligned bracket portions having apertures adapted to receive the lever shaft, an offset portion between said brackets consisting of a pair of parallel angular portions and a connecting web, a tubular guide having its ends passing through the angular portions of said offset, a pull slidable therein, a finger piece on said pull and normally contacting said offset and in spaced relation to the lever end so as to be reached by the fingers in use, a flexible throttle connection consisting of a casing and a pull wire slidable therein, the end of said casing being held within the lower end of said tube and the wire end attached to said pull.

7. In a throttle control for a gear shift lever having a hand piece threaded to its end, said control comprising a bracket having an aperture for the lever end and adapted to be clamped thereon by the hand piece, and a finger pull slidable in said bracket and supported thereby in spaced relation to its clamping aperture.

WARREN F. EISENHAUER.